Figure 1:
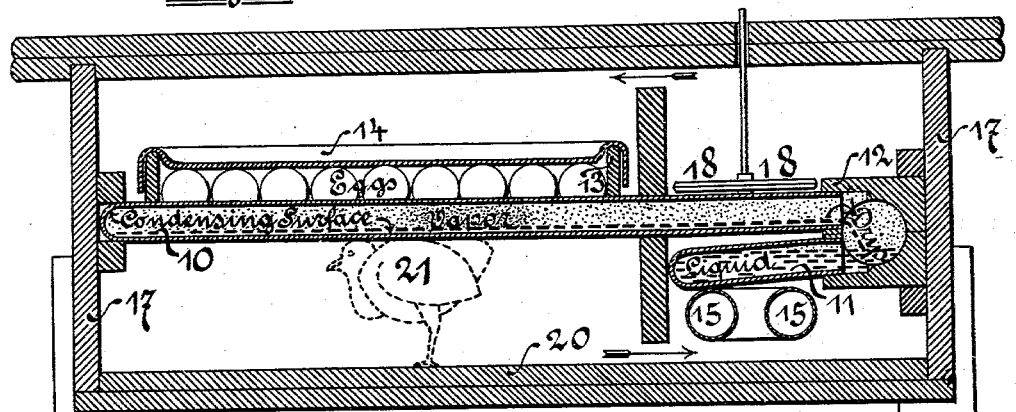

No. 743,581. PATENTED NOV. 10, 1903.
A. O. SOSSNA.
HATCHING AND BROODING BODY.
APPLICATION FILED AUG. 8, 1902.
NO MODEL.

Witnesses.
Wm A Ayres
C C Hutchison

Inventor.
Adolph O. Sossna.

No. 743,581. Patented November 10, 1903.

UNITED STATES PATENT OFFICE.

ADOLPH O. SOSSNA, OF NEAR BOWIE, MONTAGUE COUNTY, TEXAS.

HATCHING AND BROODING BODY.

SPECIFICATION forming part of Letters Patent No. 743,581, dated November 10, 1903.

Application filed August 8, 1902. Serial No. 118,974. (No model.)

*To all whom it may concern:*

Be it known that I, ADOLPH O. SOSSNA, residing near Bowie, in the county of Montague and State of Texas, have invented a new and useful Hatching and Brooding Body, of which the following is a specification.

The invention relates to an artificial heating-body for the hatching of eggs or the warming of broods; and it consists in the novel use of saturated vapor of hatching or brooding temperature as a heating medium for such a body. This heating medium is obtained by inserting a quantity of a liquid, which boils at a relatively low temperature, in the body, which is made hollow, and by vaporizing enough of this liquid so that the temperature of the vapor generated is equal to that of bird's blood, for this latter reason it being possible to bring eggs or brood in immediate contact with the body, which mode of warming the eggs or brood renders this artificial body a close imitation of the natural.

The ground for employing saturated vapor and not the commonly-used heating liquids or gases lies in the fact that with vapor as the heating medium the remotest parts of an extensive structure can be warmed to exactly the same temperature as parts in immediate contact with a source of heat, while with heating liquids or gases this is impossible, in this latter instance parts near the source of heat being always warmer than the more remote links of the heating structure. That eggs or a brood could not for the purpose stated be brought in contact with a structure heated unevenly is apparent, and the fact that in all apparatus used at the present day the eggs or brood are located at a distance from the heating-body is not an accident, but a necessity conditioned by the heating liquids or gases employed being inadequate heating media, the air between the eggs or brood and the heater serving as a means for "evening up" the heat. Such an arrangement on account of air being a very bad conductor and ineffective conveyer of heat conditions that this sheet of air, in order to warm the eggs or brood to the temperature of bird's blood, be higher in temperature than bird's blood—a state which is unnatural, and which to create it is a grave error, the so-called "moisture" problem being caused by it.

As to the amount of liquid inserted in the heating-body only a small quantity is required, the greater part of the body's interior, wholly that corresponding with the actual heat distributer, being empty and intended for saturation with vapor generated from the liquid. In order to obtain perfect saturation of this interior space with vapor, it is necessary to remove from the space enough of the air that vapor emerging from the liquid at 105° Fahrenheit, the average temperature of bird's blood, can overcome the remaining air-pressure, and then to close the body all around in order to maintain this decreased air density permanently. If the liquid chosen boils under atmospheric pressure above 105° Fahrenheit for water, the boiling-point of which under atmospheric pressure is at 212° Fahrenheit, an almost entire air-vacuum would have to be maintained. If the liquid chosen boils under atmospheric pressure below 105° Fahrenheit, then the body must be constructed to contain vapor of higher than atmospheric pressure and closed all around to provide against this pressure.

The heat available for eggs or brood is the heat freed on the interior walls of the body by vapor molecules condensing thereon into liquid, the heat required to vaporize the thereby-formed drip again being supplied by an outside source.

The accompanying drawings designate one of many possible forms of such a body, and any other form may be substituted for the one drawn, the proper working—namely, of the body—being accomplished by its being heated evenly, which circumstance relates to the heating medium and not to any structural form, the heating medium being adapted to heat any form and by bringing eggs or brood in immediate contact with the heating structure, which act refers to the application of the heating-body and does not depend upon any form of the same.

Figure 2:
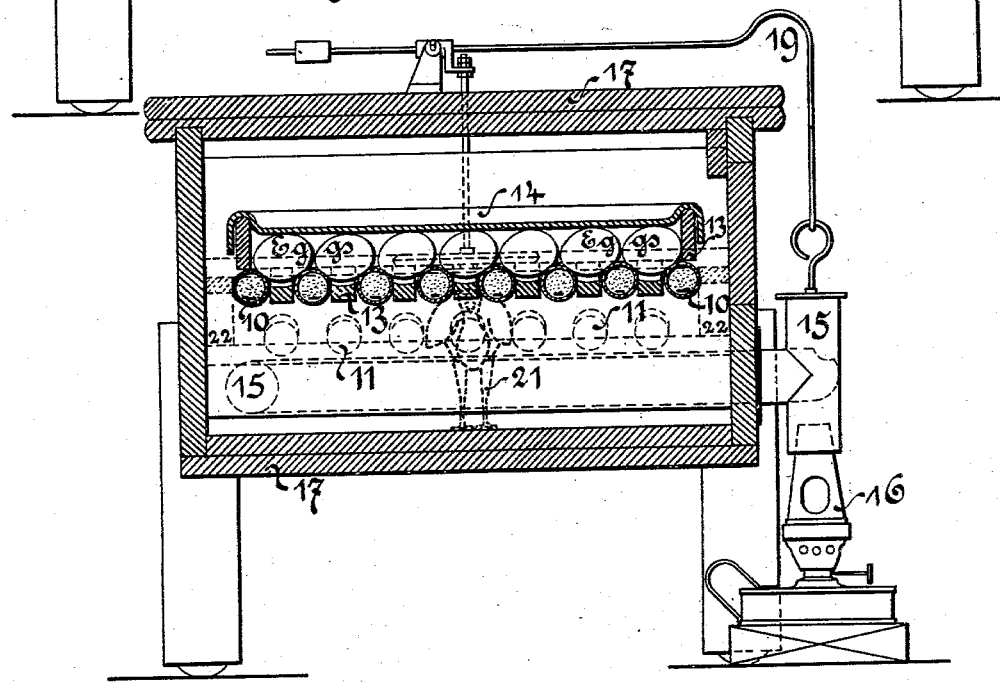

Figure 1 of the drawings is the projection upon a vertical plane of an apparatus constructed in accordance with the principles involved in this invention and as appearing in longitudinal sectional view. Fig. 2 is the projection upon a vertical plane of the same apparatus as appearing in transverse sectional view.

The heating-body as drawn is inclosed in a casing 17 and comprises long arms 10, short arms 11, and a cross-piece 12, the ends of which are closed by plugs 22, Fig. 2. The short arms contain the aforementioned liquid. The interior surface of the long arms serves as condensing-surface for the vapor generated from the liquid. The cross connects all the arms and brings them into communication, which latter fact means equal vapor-pressure throughout the interior of the body, and therefore an absolutely even temperature on the walls whereon the vapor condenses. The greater length of the long arms is the actual heat-distributer, and thereon are placed the eggs contained in a specially-constructed tray 13, having a cover 14 of porous flexible material. That the heating-body serve as a support for the entire weight of the eggs, as shown in the drawings, is not necessary. The eggs could be supported partly by the heater and partly by a structure serving as a support only. The eggs could also be pressed against the heater from below if the proper means, such as a rubber bag inflated with air might provide, were employed. The working capacity also of the heating-body would not be impaired if instead to the bare body, as shown in the drawings, the eggs were placed against a medium separating eggs and heater, provided this medium were of a material and thickness that the heat could penetrate it without measurable loss in temperature.

Heat is conveyed to the liquid in the body by the air around the coil 15 rising through the spaces between the arms 10 and 11 and giving all that of its heat, which is of a higher temperature than the body, to the liquid in the body for the boiling process. The coil 15 may be heated by a lamp 16, Fig. 2, and any other heating device may be substituted for coil and lamp. The said rising air after having been cooled between the arms passes into the space above the eggs, while an equal amount is drawn from beneath the eggs to the heating device, in this manner producing a continuous circulation of moderately-warm air in the casing.

The regulation of the temperature of the heating-body may be induced by a thermostat 18, influencing a damper apparatus 19.

For brood-warming the heating-body is arranged above a floor 20 and at such a distance therefrom that a brood 21 can reach it and press its back against it when in need of warmth.

What is claimed is—

1. An apparatus comprising a casing, arranged within the casing a hollow heating-body closed all around to provide against vapor-pressure from within or air-pressure from without and forming on the inside a condensing-surface for saturated vapor and on the outside an immediate warming-body for eggs to be rested on, substantially as and for the purpose described.

2. An apparatus comprising a casing, arranged within the casing a hollow heating-body closed all around to provide against vapor-pressure from within or air-pressure from without and forming on the inside a condensing-surface for saturated vapor and on the outside an immediate warming-body for a brood to lean against, and a floor for supporting the brood below the heating-body and within reach of the same.

3. An apparatus comprising a casing, arranged within the casing a hollow heating-body closed all around to provide against vapor-pressure from within or air-pressure from without and forming on the inside a condensing-surface for saturated vapor and on the outside an immediate warming-body for eggs to be rested on, a heating device located immediately below parts of the heating-body and outside of the egg-chamber proper, openings for air circulation arranged near the top and the bottom of the casing in the wall adjacent to the heating device, substantially as and for the purpose described.

4. An apparatus comprising a casing, arranged within the casing a hollow heating-body closed all around to provide against vapor-pressure from within or air-pressure from without and forming on the inside a condensing-surface for saturated vapor and on the outside an immediate warming-body for eggs to be rested on, a heating device located immediately below parts of the heating-body, means located vertically above the heating device and on or near the upper surface of the heating-body for influencing a heat-controlling apparatus, substantially as and for the purpose described.

5. An apparatus comprising a casing, arranged within the casing a hollow heating-body closed all around to provide against vapor-pressure from within or air-pressure from without and forming on the inside a condensing-surface for saturated vapor and on the outside an immediate support for eggs to be rested upon, and the heating-body composed of long and short arms and a cross-piece connecting the same, a hot-air coil immediately below the short arms, and means for covering the eggs, substantially as and for the purpose described.

In testimony that I claim the foregoing as my own I have hereto affixed my signature in the presence of two witnesses.

A. O. SOSSNA.

Witnesses:
CAROL CLAPP,
A. C. SCHNEIDER.